(12) United States Patent
Bill et al.

(10) Patent No.: US 12,370,843 B2
(45) Date of Patent: Jul. 29, 2025

(54) TIRE PRESSURE MONITORING DEVICES

(71) Applicants: AIRBUS OPERATIONS LIMITED, Bristol (GB); AIRBUS OPERATIONS GMBH, Hamburg (DE); AIRBUS OPERATIONS (S.A.S.), Toulouse (FR); MEGGITT SA, Villars-sur-Glâne (CH)

(72) Inventors: Andrew Bill, Bristol (GB); Stephan Marwedel, Hamburg (DE); Christelle Duchossoy, Toulouse (FR); Kevin Stanley-Adams, Villars-sur-Glâne (CH)

(73) Assignees: Airbus Operations Limited, Bristol (GB); Airbus Operations GmbH, Hamburg (DE); Airbus Operations (S.A.S.), Toulouse (FR); Meggitt SA, Villars-sur-Glane (CH)

( * ) Notice: Subject to any disclaimer, the term of this patent is extended or adjusted under 35 U.S.C. 154(b) by 301 days.

(21) Appl. No.: 18/128,173

(22) Filed: Mar. 29, 2023

(65) Prior Publication Data

US 2023/0311592 A1 Oct. 5, 2023

(30) Foreign Application Priority Data

Mar. 30, 2022 (EP) ..................................... 22305400

(51) Int. Cl.
*B60C 23/04* (2006.01)
*B64D 45/00* (2006.01)

(52) U.S. Cl.
CPC ...... *B60C 23/0471* (2013.01); *B60C 23/0405* (2013.01); *B60C 23/0406* (2013.01);
(Continued)

(58) Field of Classification Search
None
See application file for complete search history.

(56) References Cited

U.S. PATENT DOCUMENTS

| 4,059,823 A | 11/1977 | Martin et al. |
| 4,734,674 A | 3/1988 | Thomas et al. |

(Continued)

FOREIGN PATENT DOCUMENTS

| CN | 106228500 | 12/2016 |
| CN | 111361363 | 7/2020 |

(Continued)

OTHER PUBLICATIONS

U.S. Office Action for U.S. Appl. No. 17/978,757, filed Jun. 7, 2024 (17 pages).

(Continued)

*Primary Examiner* — Jelani A Smith
*Assistant Examiner* — Davin Seol
(74) *Attorney, Agent, or Firm* — Nixon & Vanderhye P.C.

(57) ABSTRACT

A method of performing a configuration procedure for first and second tire pressure monitoring devices. The method includes loading the first tire pressure monitoring device with first configuration data, and subsequently transmitting, from the first tire pressure monitoring device, a first configuration data signal which encodes the first configuration data. The method includes subsequently loading the second tire pressure monitoring device with second configuration data, and subsequently ending the configuration procedure without transmitting a second configuration data signal which encodes the second configuration data.

17 Claims, 12 Drawing Sheets

(52) U.S. Cl.
CPC .......... *B60C 23/0474* (2013.01); *B64D 45/00* (2013.01); *B60C 2200/02* (2013.01); *B64D 2045/0085* (2013.01)

(56) References Cited

U.S. PATENT DOCUMENTS

| | | | |
|---|---|---|---|
| 5,439,331 | A | 8/1995 | Bill et al. |
| 6,087,930 | A | 7/2000 | Kulka et al. |
| 6,507,276 | B1 | 1/2003 | Young |
| 6,861,950 | B2 | 3/2005 | Katou |
| 6,988,026 | B2 | 1/2006 | Breed |
| 7,295,849 | B2 | 11/2007 | Ghabra |
| 8,599,044 | B2 | 12/2013 | Maggiore et al. |
| 11,814,189 | B2 | 11/2023 | Bill |
| 2002/0014115 | A1 | 2/2002 | Young |
| 2004/0069057 | A1 | 4/2004 | Sapir |
| 2006/0220805 | A1 | 10/2006 | Thomas |
| 2007/0188315 | A1 | 8/2007 | Chung |
| 2007/0193349 | A1 | 8/2007 | Petrucelli |
| 2009/0109012 | A1 | 4/2009 | Petrucelli |
| 2010/0090878 | A1 | 4/2010 | Teuling |
| 2014/0070928 | A1 | 3/2014 | Yu et al. |
| 2014/0257603 | A1 | 9/2014 | McKeown et al. |
| 2017/0217572 | A1 | 8/2017 | Vana et al. |
| 2020/0171892 | A1* | 6/2020 | Ga .................. B60C 23/0471 |
| 2020/0342690 | A1* | 10/2020 | Wang .................. G07C 5/008 |
| 2021/0029634 | A1 | 1/2021 | Strahan |
| 2021/0039450 | A1 | 2/2021 | Dages et al. |
| 2021/0237896 | A1 | 8/2021 | Bill |
| 2022/0055420 | A1 | 2/2022 | Bill |
| 2022/0055421 | A1 | 2/2022 | Bill |
| 2022/0086934 | A1 | 3/2022 | Bill |
| 2022/0124490 | A1 | 4/2022 | Bill |
| 2022/0134812 | A1 | 5/2022 | Bill |
| 2022/0134813 | A1 | 5/2022 | Bill |
| 2022/0134815 | A1 | 5/2022 | Bill |
| 2022/0134816 | A1 | 5/2022 | Bill |
| 2022/0134818 | A1 | 5/2022 | Bill |
| 2022/0139119 | A1 | 5/2022 | Bill |
| 2022/0185038 | A1 | 6/2022 | Bill |
| 2023/0166568 | A1 | 6/2023 | Bill |
| 2023/0227175 | A1 | 7/2023 | Bill |
| 2023/0311592 | A1 | 10/2023 | Bill |
| 2023/0311593 | A1 | 10/2023 | Bill |
| 2023/0364950 | A1 | 11/2023 | Bill |
| 2023/0364951 | A1 | 11/2023 | Bill |
| 2023/0366784 | A1 | 11/2023 | Bill |
| 2023/0366785 | A1 | 11/2023 | Bill |
| 2023/0373652 | A1 | 11/2023 | Bill |
| 2024/0059108 | A1 | 2/2024 | Bill |

FOREIGN PATENT DOCUMENTS

| | | |
|---|---|---|
| EP | 1 323 605 | 7/2003 |
| EP | 2 871 079 | 5/2015 |
| EP | 2 910 393 | 8/2015 |
| EP | 3069903 | 9/2016 |
| EP | 3118030 | 1/2017 |
| EP | 3 150 408 | 4/2017 |
| EP | 3 498 501 | 6/2019 |
| EP | 3 760 504 | 1/2021 |
| EP | 3 991 996 | 5/2022 |
| GB | 2490302 | 10/2012 |
| GB | 2540414 | 1/2017 |
| GB | 2569383 A | 6/2019 |
| GB | 2584847 | 12/2020 |
| GB | 2584853 A | 12/2020 |
| GB | 2586213 | 2/2021 |
| GB | 2617599 A | 10/2023 |
| GB | 2618311 A | 11/2023 |
| GB | 2623795 A | 5/2024 |
| JP | 2003-291615 | 10/2003 |
| WO | 2017/179968 | 10/2017 |

OTHER PUBLICATIONS

Combined Search and Examination Report cited in GB2115730.0 mailed Mar. 1, 2022, 9 pages.
GB2403569.3, Search Report (Aug. 12, 2024)(5 pages).
Non-Final Office Action cited in U.S. Appl. No. 17/978,757 mailed Oct. 4, 2024, 12 pages.
Combined Search and Examination Report for GB2017246.6, dated Mar. 11, 2021, 7 pages.
Combined Search and Examination Report for GB2017248.2, dated Mar. 5, 2021, 8 pages.
Combined Search and Examination Report for GB2105406.9, dated Jan. 21, 2022, 10 pages.
Extended European Search Report for EP 21192517.7, dated Dec. 17, 2021, 7 pages.
Extended European Search Report for EP 22305400.8, dated Sep. 22, 2022, 7 pages.
Combined Search and Examination Report cited in GB 2410769.0 mailed Jan. 21, 2025, 6 pages.

* cited by examiner

TIRE PRESSURE MONITORING DEVICES

RELATED APPLICATION

This application incorporates by reference and claims priority to European patent application EP 22305400.8, filed Mar. 30, 2022.

TECHNICAL FIELD

The present invention relates to tire pressure monitoring devices.

BACKGROUND

Checking tire pressure is an important part of the maintenance of a vehicle. Tire pressures should be maintained at predetermined pressures to ensure that a tire performs as intended by the manufacturer. To check a tire pressure it is important to know what reference pressure is defined for the tire.

SUMMARY

A first aspect of the present invention provides a method comprising: loading each of a set of tire pressure monitoring devices with respective configuration data; and transmitting, from a subset of fewer than all of the set of tire pressure monitoring devices, a configuration data signal which encodes the respective configuration data.

A configuration data signal may be transmitted for each of the subset of tire pressure monitoring devices. The configuration data signal may be transmitted by the respective tire pressure monitoring device of the subset once the respective tire pressure monitoring device has been loaded, and before a next tire pressure monitoring device of the set of tire pressure monitoring devices is loaded.

Remaining tire pressure monitoring devices of the set of tire pressure monitoring devices, for example those tire pressure monitoring devices that form part of the set of tire pressure monitoring devices but are not part of the subset of tire monitoring devices, may not transmit a configuration data signal which encodes the respective configuration data.

The configuration data signal may be configured to be received and understood by a human.

The configuration data signal may comprise a signal indicative of any of a reference pressure for a tire, for example a tire to which the respective tire pressure monitoring device is attached, and an installed location of a respective tire pressure monitoring device. The configuration data may comprise a reference pressure for the tire to which the respective tire pressure monitoring device is attached.

The configuration data signal may comprise a visual signal, and the visual signal may be transmitted using a visual indicator of the respective tire pressure monitoring device.

The visual indicator may comprise a light source, and the method may comprise selectively illuminating the light source to transmit the configuration data signal.

The configuration data signal may comprise a number, and the selective illumination of the light source may comprise encoding the number into an illumination sequence representing individual digits of the number.

The method may comprise verifying, by a human, that the configuration data encoded by the configuration data signal matches expected configuration data, and verification by a human that the configuration data matches expected configuration data may take place using an untrusted device.

The subset may be a single tire pressure monitoring device of the set of tire pressure monitoring devices.

The method may comprise loading each of the subset of tire pressure monitoring devices with respective configuration data; subsequently transmitting, from the subset of the set of tire pressure monitoring devices, the configuration data signal which encodes the respective configuration data; and subsequently loading each of the remaining tire pressure monitoring devices of the set of tire pressure monitoring devices with respective configuration data.

The set of tire pressure monitoring devices may correspond to a wheel group of an aircraft.

The method may comprise loading each of a further set of tire pressure monitoring devices with respective configuration data; and transmitting, from a subset of fewer than all of the further set of tire pressure monitoring devices, a configuration data signal which encodes the respective configuration data.

The set of tire pressure monitoring devices may correspond to a first wheel group of an aircraft, and the further set of tire pressure monitoring devices may correspond to a second wheel group of the aircraft different to the first wheel group.

The subset of the further set of tire pressure monitoring devices may comprise a single tire pressure monitoring device of the further set of tire pressure monitoring devices.

Loading each of the set of tire pressure monitoring devices with respective configuration data may comprise utilising an untrusted device, for example with a user inputting desired configuration into an untrusted device before using the untrusted device to load the configuration data into the set of tire pressure monitoring devices.

Transmitting the configuration data signal which encodes the respective configuration data may take place in a configuration data check procedure, and the method may comprise: transmitting, from a further subset of the set of tire pressure monitoring devices, further respective configuration data to the subset of tire pressure monitoring devices in a tire pressure check procedure different to the configuration data check procedure; and determining, at the tire pressure monitoring devices of the subset, whether the further configuration data matches the configuration data.

The method may comprise, when the further configuration data differs from the configuration data, transmitting, from any of the set of tire pressure monitoring devices, an error signal. In some examples, the error signal is transmitted when the further configuration data does not exactly correspond to the configuration data.

A second aspect of the present invention provides a system comprising a plurality of tire pressure monitoring devices configured to operate according to the method of the first aspect of the present invention.

A third aspect of the present invention provides a tire pressure monitoring device configured to operate as part of the system of the second aspect of the present invention.

A fourth aspect of the present invention provides an aircraft comprising a system according to the second aspect of the present invention and/or a tire pressure monitoring device according to the third aspect of the present invention.

A fifth aspect of the present invention provides a method of performing a configuration procedure for first and second tire pressure monitoring devices, the method comprising loading the first tire pressure monitoring device with first configuration data, subsequently transmitting, from the first tire pressure monitoring device, a first configuration data signal which encodes the first configuration data, subsequently loading the second tire pressure monitoring device with second configuration data, and subsequently ending the configuration procedure without transmitting a second configuration data signal which encodes the second configuration data.

The first configuration data signal may be configured to be received and understood by a human.

The first configuration data signal may comprise a signal indicative of any of a reference pressure for a tire and an installed location of the first tire pressure monitoring device.

The first configuration data signal may comprise a visual signal, and the visual signal may be transmitted using a visual indicator of the first tire pressure monitoring device.

The visual indicator may comprise a light source, and the method may comprise selectively illuminating the light source to transmit the first configuration data signal.

The first configuration data signal may comprise a number, and the selective illumination of the light source may comprise encoding the number into an illumination sequence representing individual digits of the number.

The method may comprise verifying, by a human, that the first configuration data encoded by the first configuration data signal matches expected configuration data, and verification by a human that the first configuration data matches expected configuration data takes place using an untrusted device.

The first and second tire pressure monitoring devices may correspond to a wheel group of an aircraft.

The first and second tire pressure monitoring devices may be part of a set of tire pressure monitoring devices, and the method may comprise: loading each of a further set of tire pressure monitoring devices with respective configuration data; and transmitting, from a subset of fewer than all of the further set of tire pressure monitoring devices, a configuration data signal which encodes the respective configuration data.

The set of tire pressure monitoring devices may correspond to a first wheel group of an aircraft, and the further set of tire pressure monitoring devices may correspond to a second wheel group of the aircraft different to the first wheel group.

The subset of the further set of tire pressure monitoring devices may comprise a single tire pressure monitoring device of the further set of tire pressure monitoring devices.

Loading each of the first and second tire pressure monitoring devices with respective first and second configuration data may comprise utilising an untrusted device.

The first and second tire monitoring devices may form part of a set of tire monitoring devices, and the transmitting the first configuration data signal which encodes the first configuration data may take place in a configuration data check procedure, and the method may comprise: transmitting, from a further subset of the set of tire pressure monitoring devices, further respective configuration data to at least one of the first and second tire pressure monitoring devices in a tire pressure check procedure different to the configuration data check procedure; and determining, at the at least one of the first and second tire pressure monitoring devices, whether the further configuration data matches the respective first or second configuration data.

The method may comprise, when the further configuration data differs from the respective first or second configuration data, transmitting, from any of the set of tire pressure monitoring devices, an error signal.

A sixth aspect of the present invention provides a system comprising first and second tire pressure monitoring devices configured to operate according to the method of the first aspect of the present invention.

A seventh aspect of the present invention provides a tire pressure monitoring device configured to operate as part of the system according to the sixth aspect of the present invention.

An eighth aspect of the present invention provides an aircraft comprising at least one of a system according to the sixth aspect of the present invention and a tire pressure monitoring device according to the seventh aspect of the present invention.

BRIEF DESCRIPTION OF THE DRAWINGS

Embodiments of the invention will now be described, by way of example only, with reference to the accompanying drawings, in which.

DETAILED DESCRIPTION

Figure 1:
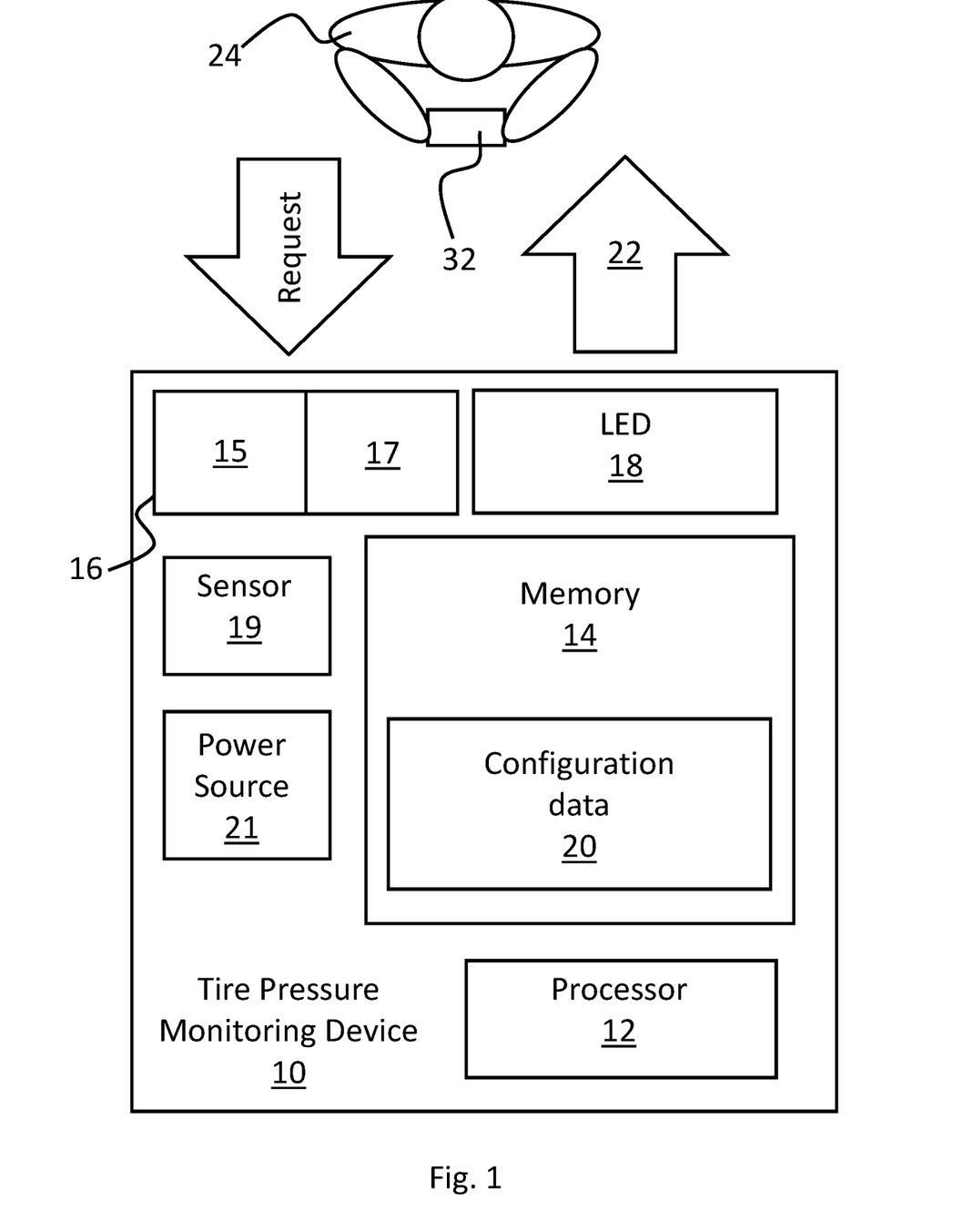
FIG. 1 shows a schematic view of a tire pressure monitoring device.

A tire pressure monitoring device 10 according to an example is shown schematically in FIG. 1. The tire pressure monitoring device 10 comprises a processor 12, a memory 14, a transceiver 16, a visual indicator or display which is an LED 18 in this example, a sensor 19 and a power source 21. Although the visual indicator here is an LED, in other examples the visual indicator may comprise another appropriate visual indicator such as an LCD screen or the like.

The processor 12 may be any suitable processor including single and multi-core processors, an Application Specific Integrated Circuit (ASIC) or the like. The processor 12 is communicatively coupled to the transceiver 16, the LED 18, the memory 14 and the power source 21.

Memory 14 is a flash memory that stores configuration data 20 and also computer readable instructions for execution by the processor 12 in operation, although it will be appreciated that other types of memory may be used. The configuration data 20 can therefore be updated as required with new values, which depend on the aircraft the device is installed on, or other factors. A reference tire pressure is stored in the configuration data 20. Additional data can also be stored in the configuration data 20, for example an aircraft identifier (such as an aircraft tail identifier) and a wheel position.

Transceiver 16 is an appropriate transceiver capable of receiving a request to confirm the configuration data 20. In this example, the transceiver 16 comprises a first 15 short-range radio signal transceiver operating according to the NFC protocol, and a second 17 transceiver operating according to a Bluetooth® low energy (BLE) communication protocol. In other examples transceivers operating according to other protocols, for example Wi-Fi, are also envisaged. When the transceiver 16 receives a request to confirm the configuration data 20, the processor 12 encodes the configuration data 20 stored in the memory 14 of the tire pressure monitoring device 10, and transmits a signal 22 indicative of the configuration data 20 via the LED 18 to a user 24 observing the tire pressure monitoring device 10. Here the LED 18 is a three-colour LED which is capable of displaying red, blue, and green coloured light. Other examples may use a different number of colours of light than three and/or use other colours than red, blue, and green. In examples herein, the user 24 is a human. As the user 24 can be taken to be a trusted source, and the tire pressure monitoring device 10 is itself a trusted source, an untrusted device 32 can be used to input the user's verification of the configuration data 20, as will be discussed in more detail hereafter. In other examples the signal may additionally or alternatively take the form of any of a signal displayed on an LCD screen in the form of flashing lights, pictures, or text. In some examples, the signal may comprise any human readable signal, for example any combination of visual and/or audio signals.

Figure 2:
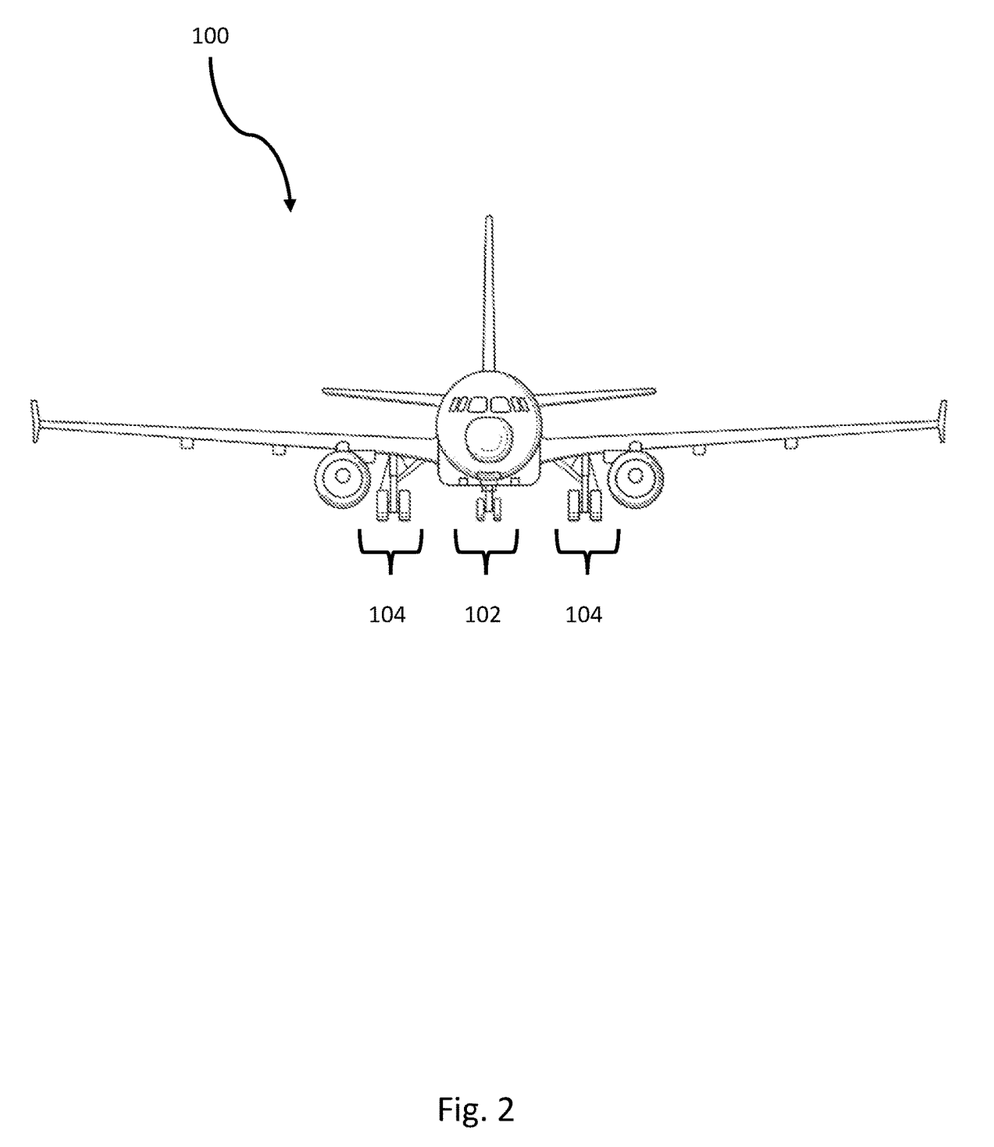
FIG. 2 shows a schematic view of an aircraft incorporating a number of tire pressure monitoring devices as shown in FIG. 1.
Figure 3:
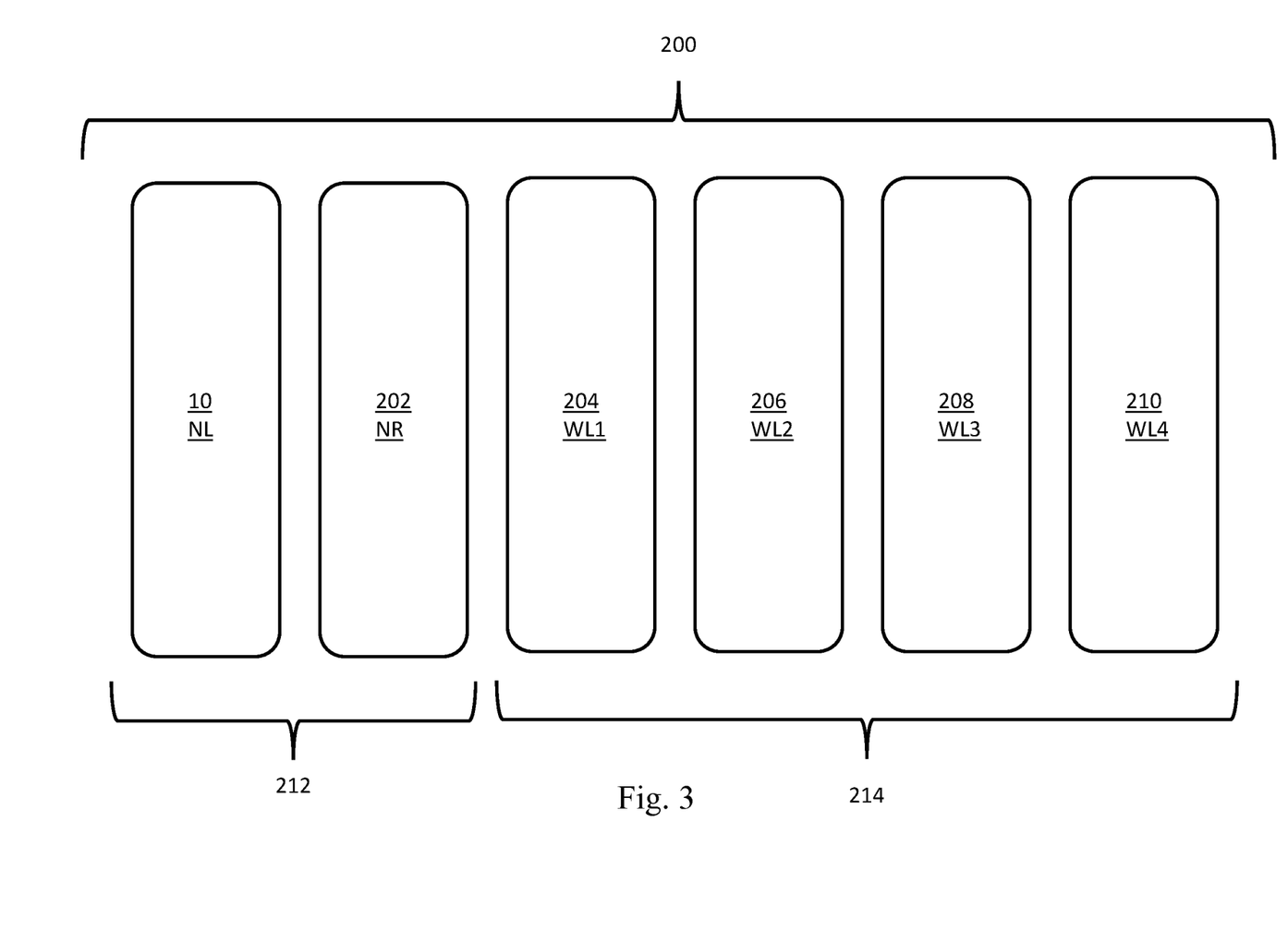
FIG. 3 shows a schematic view of a network of tire pressure monitoring devices.

The tire pressure monitoring device 10 is installed on an aircraft 100 in use, and is one of a network 200 of tire pressure monitoring devices, with the aircraft 100 illustrated schematically in FIG. 2, and the network 200 of tire pressure monitoring devices illustrated schematically in FIG. 3. As an example, the aircraft 100 has a first group 102 of two nose wheels, and a second group 104 of four main landing gear wheels. Each wheel in the first 102 and second 104 groups of wheels has an associated tire pressure monitoring device, such that there are six tire pressure monitoring devices installed on the aircraft 100. It will be appreciated that other numbers and arrangements of wheels, and hence tire pressure monitoring devices, are also envisaged.

As illustrated in FIG. 3, the tire pressure monitoring device 10 is a first tire pressure monitoring device utilised as left nose tire pressure monitoring device 10, with a second tire pressure monitoring device 202 being a right nose tire pressure monitoring device, a third tire pressure monitoring device 204 being a first main landing gear tire pressure monitoring device, a fourth tire pressure monitoring device 206 being a second main landing gear tire pressure monitoring device, a fifth tire pressure monitoring device 208 being a third main landing gear tire pressure monitoring device, and a sixth tire pressure monitoring device 210 being a fourth main landing gear tire pressure monitoring device. It will be appreciated that each of the second 202 through sixth 210 tire pressure monitoring devices has substantially the same structure and functionality as the first tire pressure monitoring device 10 illustrated in FIG. 1. It will further be appreciated that the locations of each tire pressure monitoring device 10,202,204,206,208,210 are illustrative only, and that any of the tire pressure monitoring devices 10,202,204, 206,208,210 could be used at any wheel location on an aircraft, if so desired.

Collectively, the first 10 and second 202 tire pressure monitoring devices may be thought of as a first set 212 of tire pressure monitoring devices corresponding to the first wheel group 102, and the third 204 through sixth 210 tire pressure monitoring devices may be thought of as a second set 214 of tire pressure monitoring devices corresponding to the second wheel group 104.

When initially installed on the aircraft 100, the tire pressure monitoring devices 10,202,204,206,208,210 are not configured, i.e. do not store the configuration data 20, and are incapable of direct communication between one another. The user 24 therefore uses the untrusted device 32 to configure the network 200 of tire pressure monitoring devices 10,202,204,206,208,210, as will now be described.

Initially, the user 24 approaches the first tire pressure monitoring device 10 to begin configuration. The user 24 inputs the desired configuration data 20 for the first tire pressure monitoring device 10, including the wheel location and reference pressure, into the untrusted device 32, and the untrusted device 32 is used to establish communication with the first tire pressure monitoring device 10. The configuration data 20 is then transferred from the untrusted device 32 to the first tire pressure monitoring device 10 via a Bluetooth® low energy protocol using the second transceiver 17. In other examples the configuration data 20 is transferred from the untrusted device 32 to the first tire pressure monitoring device 10 via a near field communication protocol using the first transceiver 15. The configuration data 20 is then stored in the memory 14, with the first tire pressure monitoring device 10 deleting any previously stored configuration data before the newly received configuration data 20 is stored.

Whilst still at the first tire pressure monitoring device 10 the user 24 checks that the configuration data 20 that has been stored correctly in the memory 14, with the task being led by an aircraft maintenance manual (AMM).

Figure 4:
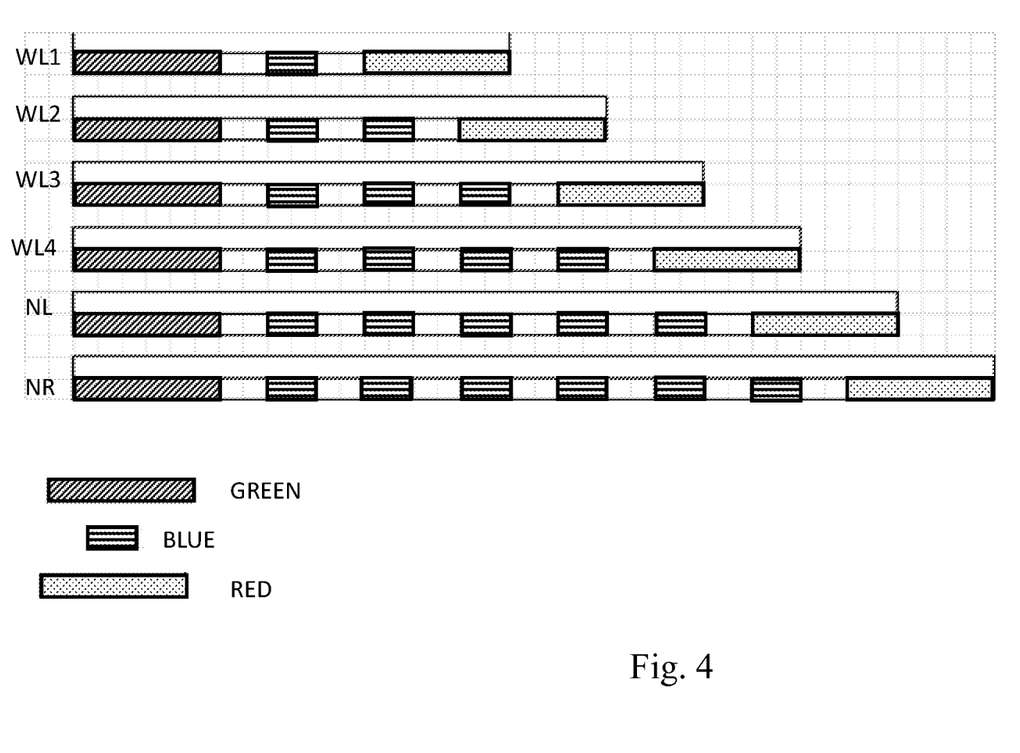
FIG. 4 shows illustrative flashing sequences for LEDs of the tire pressure monitoring devices of FIG. 1 to show device location configuration.

One piece of configuration data 20 to be checked is the installed location of the first tire pressure monitoring device 10. Here, as an example, an AMM task card may provide to the user a list of tire pressure monitoring device locations, e.g. nose left, nose right, and so on, along with an associated expected flash sequence for the LED 18 which would correctly indicate the associated tire pressure monitoring device location. In the case of the first tire pressure monitoring device 10, which is used as the left nose tire pressure monitoring device in the example previously described, an appropriate flash sequence of the LED 18 may be one green flash, followed by five blue flashes, followed by one red flash. Illustrative appropriate flash sequences (i.e. signals 22) for tire pressure monitoring device location are shown schematically in FIG. 4.

Figure 5A:
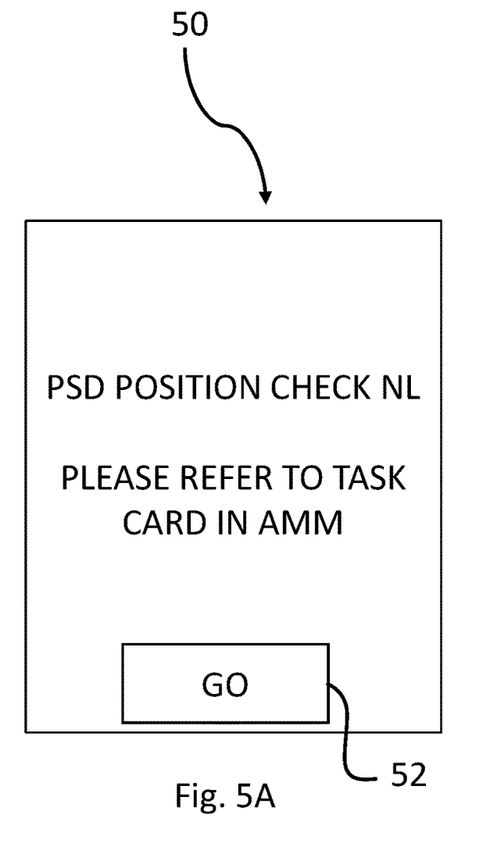
FIG. 5A shows a user interface for initiating a device location configuration check.
Figure 5B:
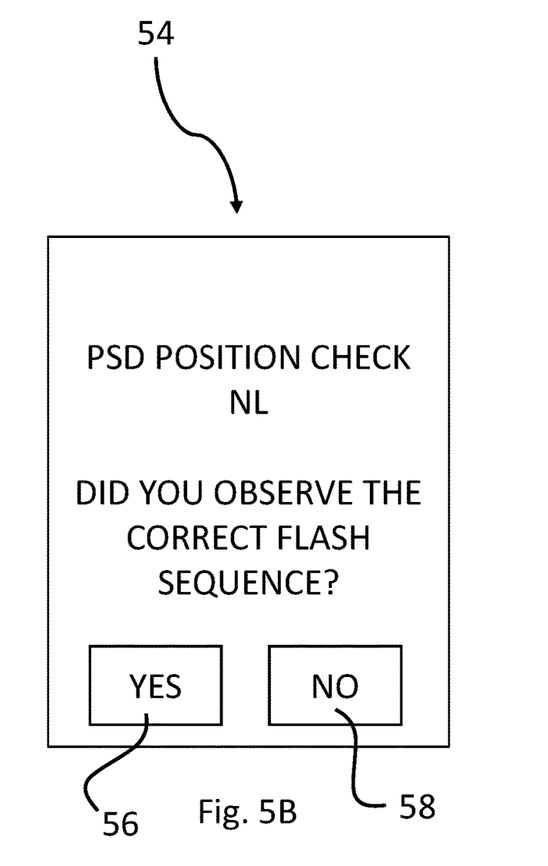
FIG. 5B shows a user interface for verifying a signal seen during a device location configuration check.

When checking the installed location of the first tire pressure monitoring device 10, the user 24 submits a request for the first tire pressure monitoring device 10 to display the installed location, via the LED 18, using a user interface of the untrusted device 32. The untrusted device 32 does not tell the first tire pressure monitoring device 10 which sequence to flash, but rather provides an instruction for the first tire pressure monitoring device 10 to flash its sequence indicative of the installed location. An exemplary user interface 50 for starting the check is shown in FIG. 5A, with the user interacting with user interface element 52 to start the check. An exemplary user interface 54 for a user 24 to verify the signal 22 is shown in FIG. 5B, with the user 24 interacting with user interface elements 56,58 to indicate whether the signal 22 is verified or not. If the signal 22, here indicative of installed location of the first tire pressure monitoring device 10, is not verified, then the configuration data 20 needs to be reloaded, with the process described above repeated.

As the user 24 can be taken to be a trusted source, and the first tire pressure monitoring device 10 is itself a trusted source, the untrusted device 32 can be used to input the user's verification of the configuration data 20. The verification can be trusted because it occurs between the user 24 (who is trusted) and tire pressure monitoring device 10 (which is trusted because of its certification to a particular DAL).

Figure 6:
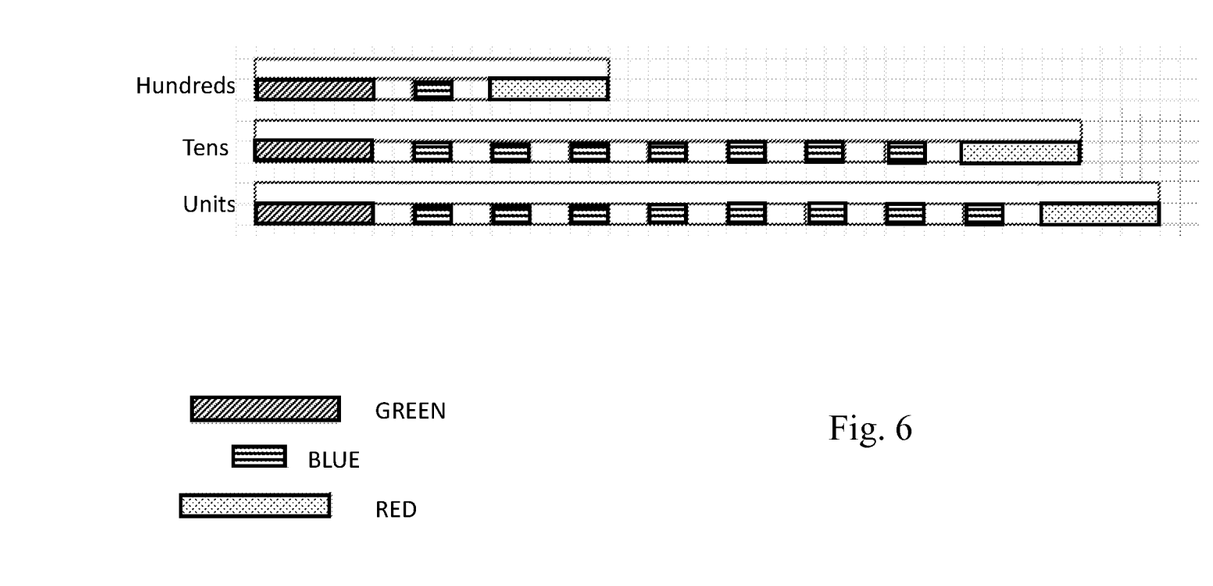
FIG. 6 shows illustrative flashing sequences for LEDs of the tire pressure monitoring devices of FIG. 1 to show device reference pressure configuration.

Another piece of configuration data 20 to be checked is the installed reference pressure of the first tire pressure monitoring device 10. Here, as an example, an AMM task card may provide to the user 24 a list of reference pressures for different tire pressure monitoring device locations, e.g., nose left, nose right, and so on, along with an associated expected flash sequence for the LED 18 which would correctly indicate the associated tire pressure monitoring device reference pressure. In the case of the first tire pressure monitoring device 10, which is used as the left nose tire pressure monitoring device in the example previously described, an appropriate reference pressure may be 178 PSI. Here separate flash sequences of the LED 18 may be performed for each digit of the reference pressure, i.e. a first flash sequence/signal 22 for the "hundreds" digit, a second flash sequence/signal 22 for the "tens" digit, and a third flash sequence/signal 22 for the "units" digit. The first flash sequence of the LED 18 in such a case may be one green flash, followed by one blue flash, followed by one red flash. The second flash sequence of the LED 18 in such a case may be one green flash, followed by seven blue flashes, followed by one red flash. The third flash sequence of the LED 18 in such a case may be one green flash, followed by eight blue flashes, followed by one red flash. Illustrative appropriate flash sequences (i.e. signals 22) for tire pressure monitoring device reference pressure are shown schematically in FIG. 6. Here a green flash indicates a start of transmission of the signal, blue flashes indicate informational content of the signal 22, and a red flash indicates an end of transmission of the signal 22.

Figure 7A:
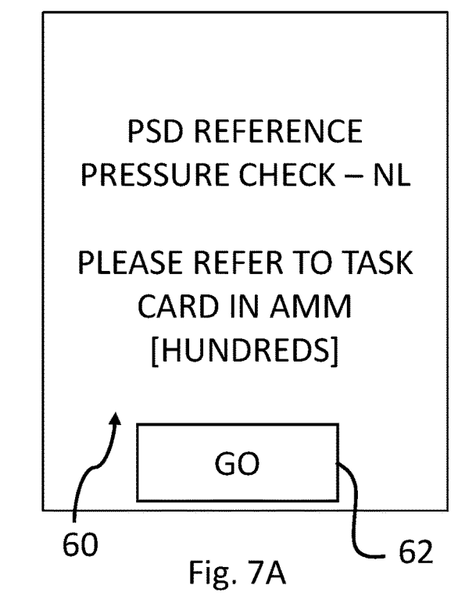
FIG. 7A shows a user interface for initiating a device reference pressure first digit configuration check.
Figure 7B:
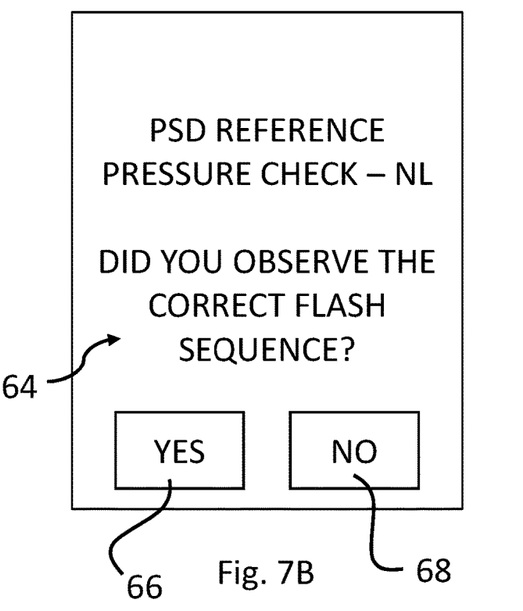
FIG. 7B shows a user interface for verifying a signal seen during a device reference pressure first digit configuration check.

When checking the installed reference pressure of the first tire pressure monitoring device 10, the user 24 submits a request for the first tire pressure monitoring device 10 to display the installed reference pressure, via the LED 18, using a user interface of the untrusted device 32. The untrusted device 32 does not tell the first tire pressure monitoring device 10 which sequence to flash, but rather provides an instruction for the first tire pressure monitoring device 10 to flash its sequence indicative of the installed reference pressure. An exemplary user interface 60 for starting the check for the "hundreds" digit is shown in FIG. 7A, with the user 24 interacting with user interface element 62 to start the check for the "hundreds" digit. An exemplary user interface 64 for a user 24 to verify the signal 22 for the "hundreds" digit is shown in FIG. 7B, with the user 24 interacting with user interface elements 66,68 to indicate whether the signal 22 is verified or not.

Figure 7C:
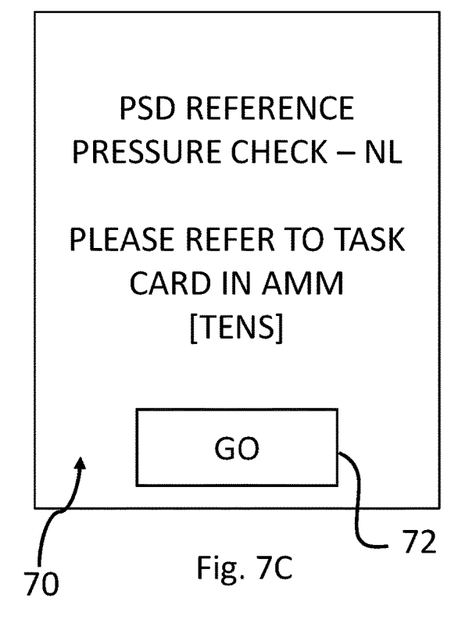
FIG. 7C shows a user interface for initiating a device reference pressure second digit configuration check.
Figure 7D:
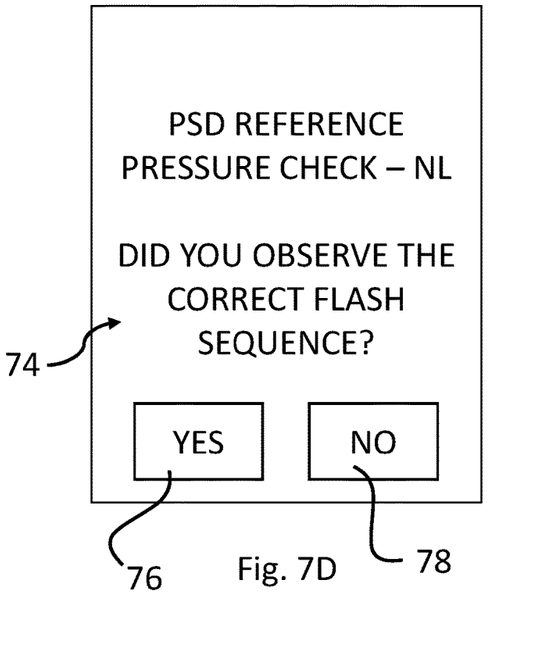
FIG. 7D shows a user interface for verifying a signal seen during a device reference pressure second digit configuration check.
Figure 7E:
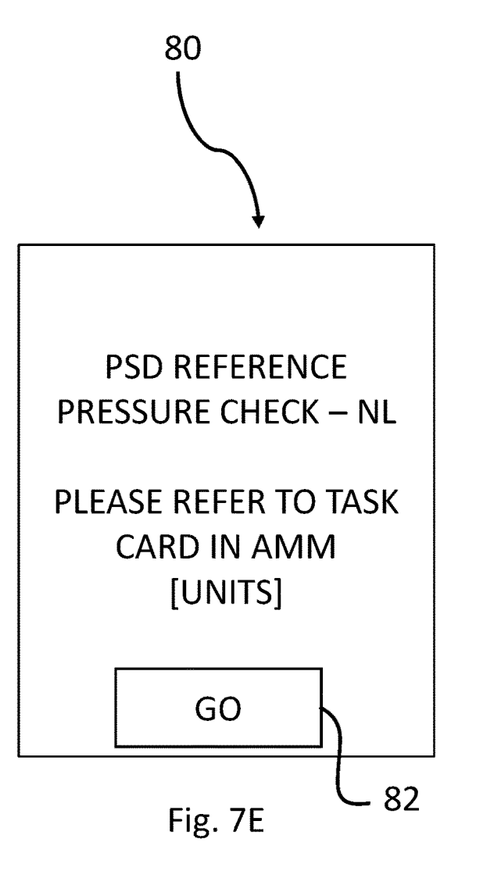
FIG. 7E shows a user interface for initiating a device reference pressure third digit configuration check.
Figure 7F:
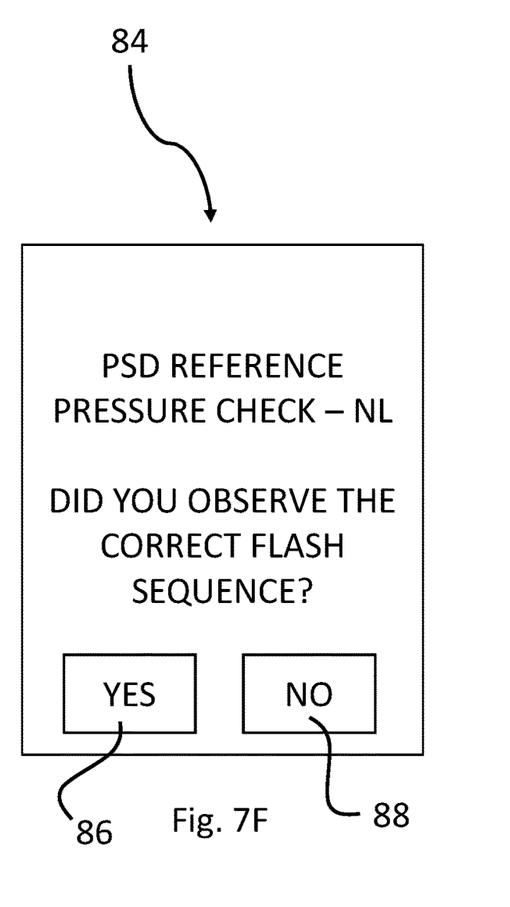
FIG. 7F shows a user interface for verifying a signal seen during a device reference pressure third digit configuration check.

Similarly an exemplary user interface 70 for starting the check for the "tens" digit is shown in FIG. 7C, with the user 24 interacting with user interface element 72 to start the check for the "tens" digit. An exemplary user interface 74 for a user 24 to verify the signal 22 for the "tens" digit is shown in FIG. 7D, with the user 24 interacting with user interface elements 76,78 to indicate whether the signal 22 is verified or not. An exemplary user interface 80 for starting the check for the "units" digit is shown in FIG. 7E, with the user 24 interacting with user interface element 82 to start the check for the "units" digit. An exemplary user interface 84 for a user to verify the signal 22 for the "units" digit is shown in FIG. 7F, with the user 24 interacting with user interface elements 86,88 to indicate whether the signal 22 is verified or not.

Once the desired configuration data 20 has been verified for the first tire pressure monitoring device 10, the user can move to the next tire pressure monitoring device 202,204, 206,208,210 for configuration to take place.

It has been found that it may not be necessary to check the reference pressure stored in configuration data 20 for each tire pressure monitoring device 10,202,204,206,208,210, and that, instead, it may be sufficient to check the reference pressure in configuration data for a single tire pressure monitoring device per wheel group, i.e. one tire pressure monitoring device within the first group 102 and one tire pressure monitoring device within the second group 104. This may reduce the time taken for the user 24 to configure the network 200 relative to, for example, a corresponding network where the reference pressure stored in configuration data is checked for each tire pressure monitoring device. A potential time saving is greater when the tire pressure monitoring device comprises a basic indicator, such as the LED 18, but there is still a time saving for any type of indicator because fewer steps are required.

In the network 200 described above, this may mean that for the first group 102 of two nose wheels, and hence for the first set 212 of tire pressure monitoring devices corresponding to the first 10 and second 202 tire pressure monitoring devices, only the reference pressure from the configuration data 20 of the first tire pressure monitoring device 10 is communicated to the user 24, without the reference pressure of the configuration data 20 of the second tire pressure monitoring device 202 being communicated to the user 24. Here the first tire pressure monitoring device 10 is a subset of the first set 212 of tire pressure monitoring devices.

Similarly, for the second group 104 of four main landing gear wheels, and hence for the second set 214 of tire pressure monitoring devices corresponding to the third 204 through sixth 210 tire pressure monitoring devices, only the reference pressure of the third tire pressure monitoring device 204 is communicated to the user 24, without the reference pressure of the configuration data 20 of the fourth 206, fifth 208 and sixth 210 tire pressure monitoring devices being communicated to the user 24. Here the third tire pressure monitoring device 204 is a subset of the second set 214 of tire pressure monitoring devices.

Figure 8:
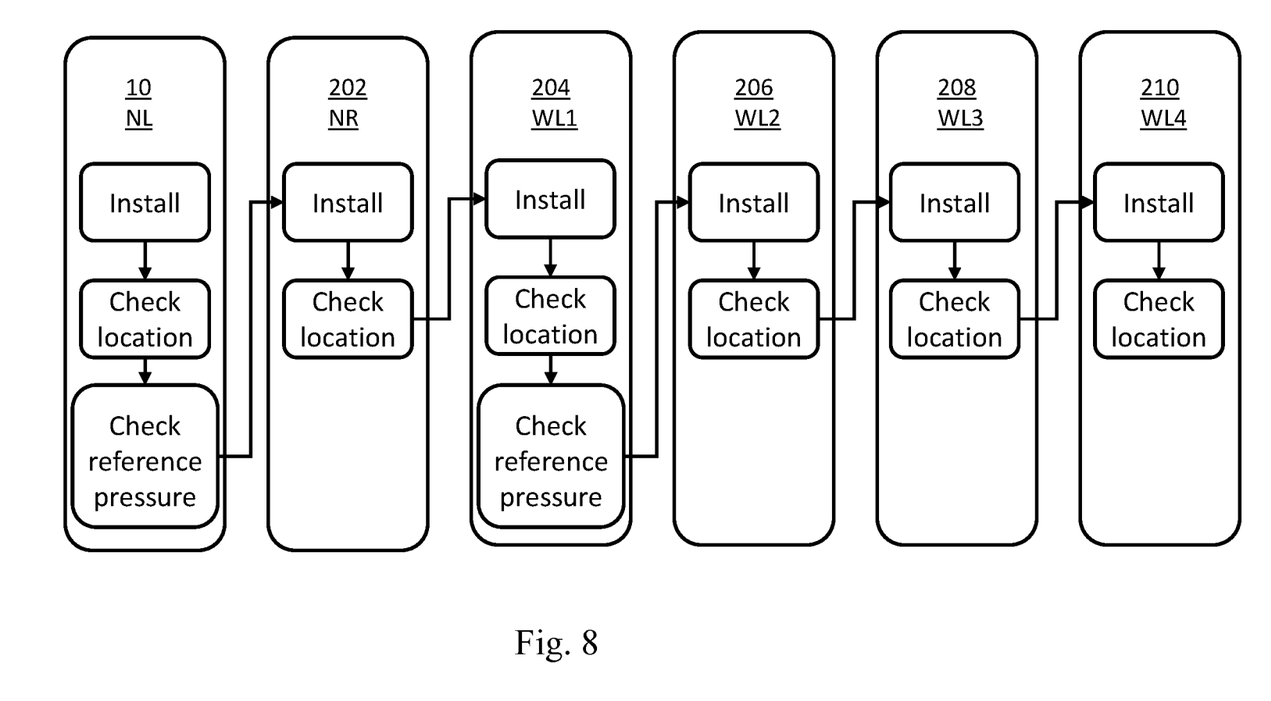
FIG. 8 schematically illustrates steps in configuring the network of tire pressure monitoring devices of FIG. 3.

The configuration process described above is illustrated schematically in FIG. 8.

In some examples it may not be necessary to check the installed location in configuration data 20 for each tire pressure monitoring device 10,202,204,206,208,210, and that, instead, it may be sufficient to check the installed location in configuration data for a single tire pressure monitoring device per wheel group, i.e. one tire pressure monitoring device within the first group 102 and one tire pressure monitoring device within the second group 104.

Figure 9:
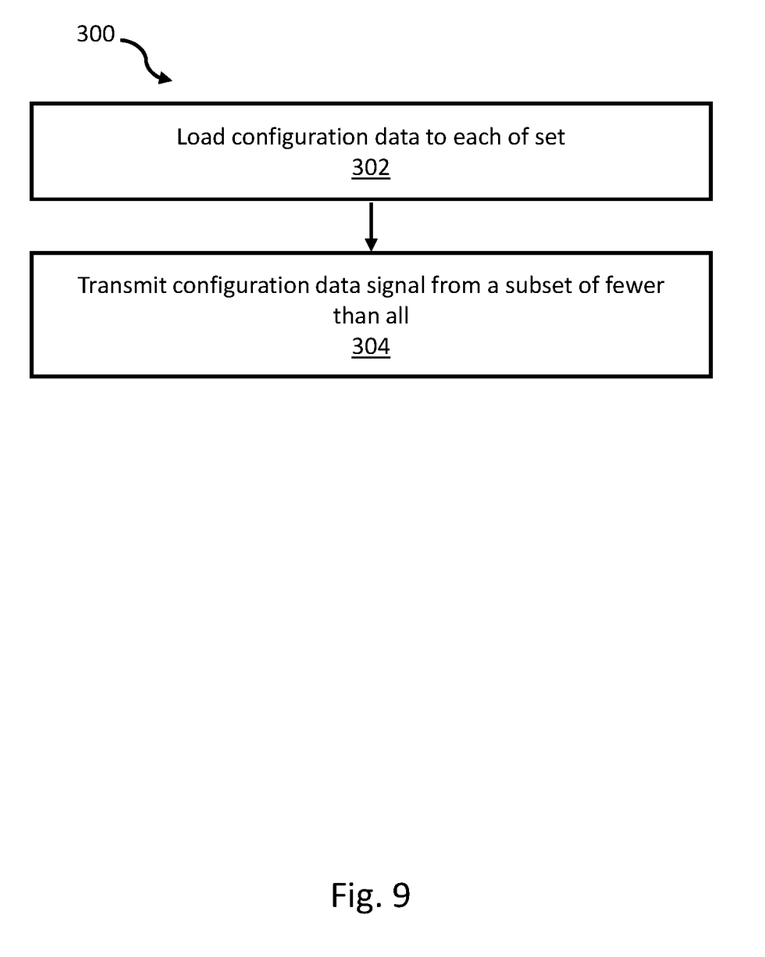
FIG. 9 shows a first method of loading and checking configuration data in accordance with the present disclosure.

A method 300 in accordance with the above is illustrated in the flow diagram of FIG. 9. The method 300 comprises loading 302 each of a set of tire pressure monitoring devices with respective configuration data, and transmitting 304, from a subset of fewer than all of the set of tire pressure monitoring devices, a configuration data signal which encodes the respective configuration data.

Although each of the second 202 and fourth 206 through sixth 210 tire pressure monitoring devices do not communicate their reference pressure stored in respective configuration data 20 to the user 24 for verification, the fact that it has been correctly received and configured by those devices may be facilitated by communication amongst the network 200 of tire pressure monitoring devices 10,202,204,206,208, 210.

In particular, as part of the process of configuring the tire pressure monitoring devices 10,202,204,206,208,210, secure communication may be set-up amongst the tire pressure monitoring devices 10,202,204,206,208,210, for example by exchange of appropriate cryptographic parameters. Details of how the secure communication is set-up will not be described for the sake of brevity, and it will be appreciated by a person skilled in the art that there are many ways in which secure communication can be set-up in the network 200 of tire pressure monitoring devices 10,202,204, 206,208,210. Once secure communication is established, the tire pressure monitoring devices 10,202,204,206,208,210 can communicate amongst themselves securely using encryption so that messages cannot be easily read and/or modified by other devices.

Once secure communication has been established, subsequent tire pressure checks can be performed. In one example, the user 24 initiates a tire pressure check at any of the tire pressure monitoring devices 10,202,204,206,208, 210. Each tire pressure monitoring device 10,202,204,206, 208,210 communicates with each other tire pressure monitoring device 10,202,204,206,208,210, with configuration data 20 transferred between the tire pressure monitoring devices 10,202,204,206,208,210.

Each tire pressure monitoring device 10,202,204,206,208, 210 checks that it is the only one with a particular stored location in configuration data 20, and that the network 200 of tire pressure monitoring devices 10,202,204,206,208,210 is complete, i.e. that there are six tire pressure monitoring devices 10,202,204,206,208,210.

Each tire pressure monitoring device 10,202,204,206,208, 210 also compares its stored reference pressure in configuration data 20 with the stored reference pressure in configuration data of other tire pressure monitoring devices 10,202, 204,206,208,210 within the same subset 212,214. For example, the first 10 and second 202 tire pressure monitoring devices compare their stored reference pressures, and the third 204 through sixth tire pressure monitoring devices compare their stored reference pressures.

Where any of the above-mentioned checks fail, for example where there is more than one tire pressure monitoring device 10,202,204,206,208,210 with the same stored location, where the network 200 is incomplete, or where reference pressures within the first set 212 or within the second set 214 do not match, an error signal is transmitted by the tire pressure monitoring devices 10,202,204,206,208, 210. In some examples the error message comprises a flash of the LED 18, for example over an extended period of time. In one particular example, a red flash of the LED 18 may indicate an error message.

Where the above-mentioned checks are successfully completed, with all criteria met, the tire pressure monitoring devices 10,202,204,206,208,210 each compare their sensed tire pressure with their stored reference pressure. Where the sensed tire pressures all match the respective stored reference pressures, the LED 18 of each tire pressure monitoring device 10,202,204,206,208,210 is illuminated green to indicate that the sensed tire pressures are acceptable. Where any of the sensed tire pressures do not match the respective stored reference pressures, the LED 18 of each tire pressure monitoring device 10,202,204,206,208,210 is illuminated red to indicate that the sensed tire pressures are not acceptable. For example, the methods described in EP 33498501A1, incorporated herein by reference, can be used to enable tire pressure monitoring devices to all indicate that tire pressures are not acceptable when one or more of the tire pressure monitoring devices determine that the sensed pressure is not acceptable. The sensed tire pressures may then be transmitted offline such that appropriate action, for example inflation or replacement of a tire, can be taken.

Given that the tire pressure monitoring devices 10,202, 204,206,208,210 check the stored reference pressures amongst themselves during a tire pressure check, it may be considered sufficient that a subset of fewer than all, and more particularly a single one, of the tire pressure monitoring devices 10,202,204,206,208,210 of each respective first set 212 and second set 214, is checked for the stored reference pressure during configuration of the tire pressure monitoring devices 10,202,204,206,208,210. This may reduce a time taken to configure the tire pressure monitoring device 10,202,204,206,208,210, and may reduce a burden on the user 24.

Additionally or alternatively to the tire pressure monitoring devices 10,202,204,206,208,210 checking the stored reference pressures amongst themselves during a tire pressure check, the tire pressure monitoring devices 10,202,204, 206,208,210 may communicate the configuration data 20, and hence the stored reference pressures, amongst themselves once secure communication has been established, for example as part of a check of correct loading of the configuration, or even during establishment of secure communication, for example as part of generating and/or exchanging secure keys. In such circumstances, the tire pressure monitoring devices 10,202,204,206,208,210 may directly or indirectly check the stored reference pressures amongst themselves, with an error being indicated by any of the tire pressure monitoring devices 10,202,204,206,208, 210 where appropriate stored reference pressures do not match.

In light of this, it may be considered sufficient that a subset of fewer than all, and more particularly a single one, of the tire pressure monitoring devices 10,202,204,206,208, 210 of each respective first set 212 and second set 214, is checked for the stored reference pressure during configuration of the tire pressure monitoring devices 10,202,204,206, 208,210. This may reduce a time taken to configure the tire pressure monitoring device 10,202,204,206,208,210, and may reduce a burden on the user 24.

Figure 10:
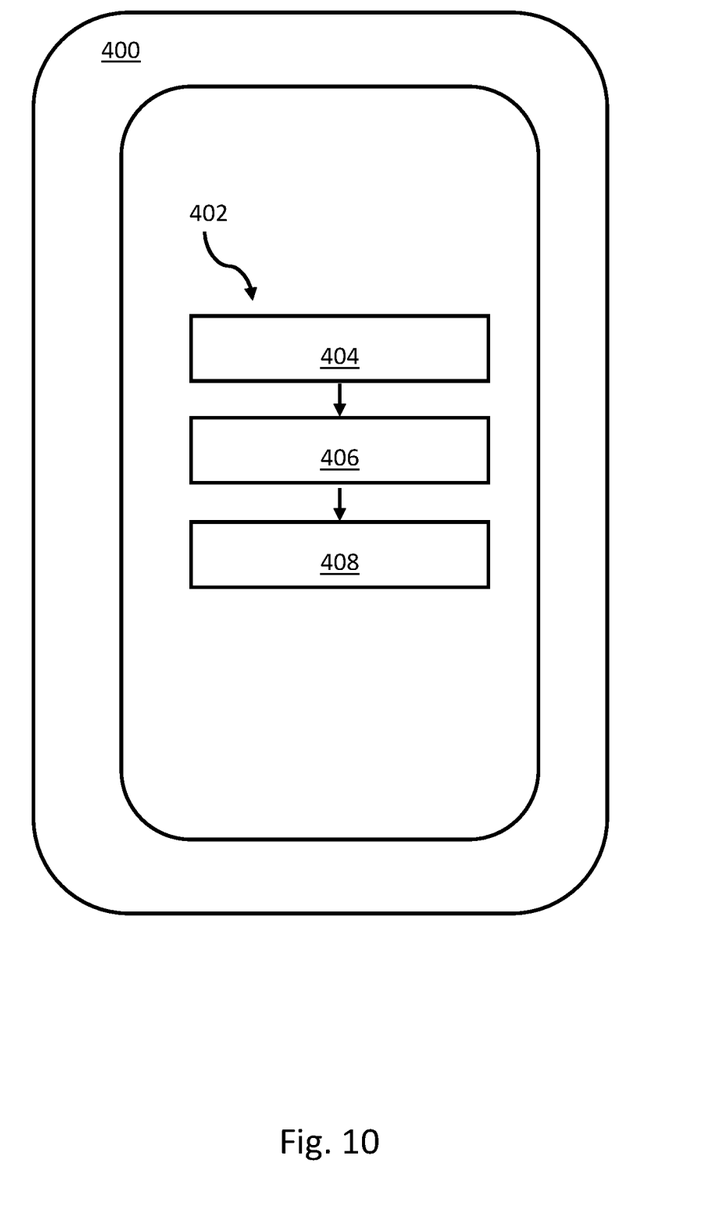
FIG. 10 shows a data carrier in accordance with the present disclosure.

A data carrier 400 is illustrated schematically in FIG. 10, and comprises machine readable instructions 402 which control operation of the processor 12 of any of the tire pressure monitoring devices 10,202,204,206,208,210 to receive 404 further configuration data from a further tire pressure monitoring device, compare 406 the received further configuration data to the configuration data stored in the memory, and where the received further configuration data differs from the configuration data by more than a predetermined threshold, illuminate 408 the light source to transmit an error signal.

Figure 11:
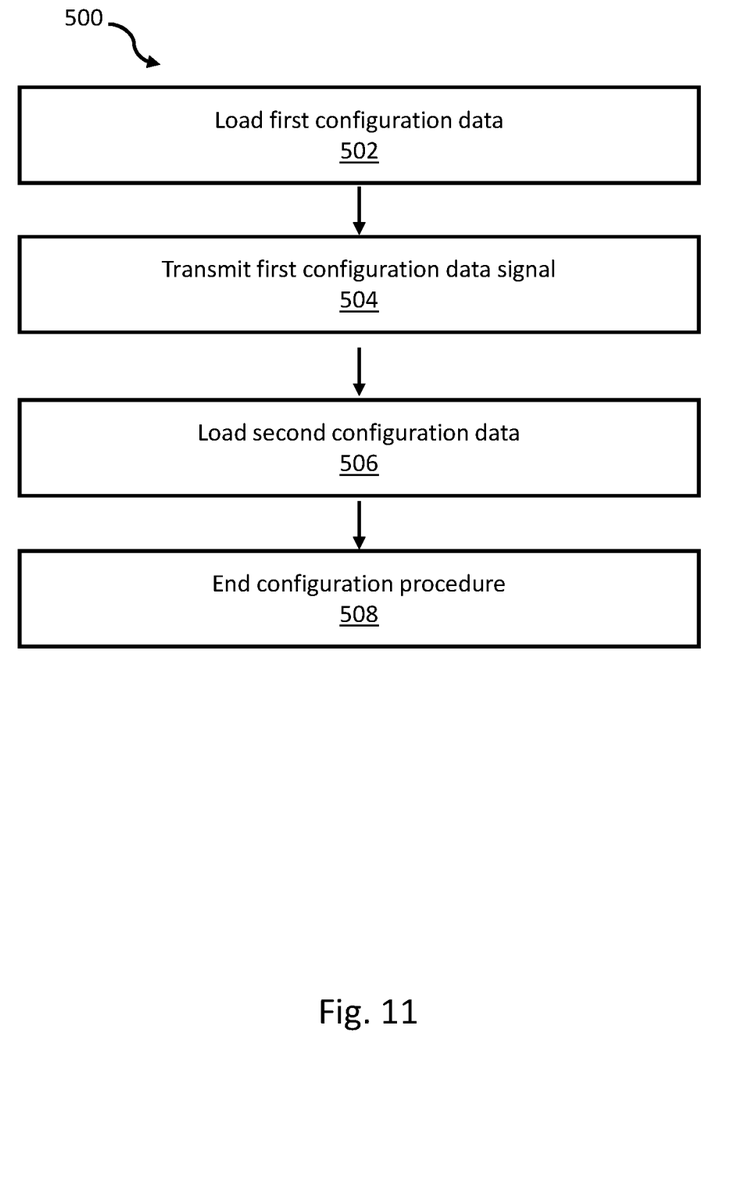
FIG. 11 shows a second method of loading and checking configuration data in accordance with the present disclosure.

A further method 500 in accordance with the present disclosure is illustrated in FIG. 11. The method 500 includes loading 502 a first tire pressure monitoring device with first configuration data, and subsequently transmitting 504, from the first tire pressure monitoring device, a first configuration data signal which encodes the first configuration data. The method 500 includes subsequently loading 506 the second tire pressure monitoring device with second configuration data, and subsequently ending 508 the configuration procedure without transmitting a second configuration data signal which encodes the second configuration data. It will be appreciated that further tire pressure monitoring devices may be loaded with further configuration data without transmitting further configuration data signals which encode the further configuration data.

It is to noted that the term "or" as used herein is to be interpreted to mean "and/or", unless expressly stated otherwise.

The invention claimed is:

1. A method of performing a configuration procedure for first and second tire pressure monitoring devices, the method comprising:
    loading the first tire pressure monitoring device with first configuration data,
    subsequently transmitting, from the first tire pressure monitoring device, a first configuration data signal which encodes the first configuration data,
    subsequently loading the second tire pressure monitoring device with second configuration data, and
    subsequently ending the configuration procedure without transmitting a second configuration data signal which encodes the second configuration data.

2. The method according to claim 1, wherein the first configuration data signal is configured to be received and understood by a human.

3. The method according to claim 1, wherein the first configuration data signal comprises a signal indicative of any of a reference pressure for a tire and an installed location of the first tire pressure monitoring device.

4. The method according to claim 1, wherein the first configuration data signal comprises a visual signal, and
    the method further comprises transmitting the visual signal using a visual indicator of the first tire pressure monitoring device.

5. The method according to claim 4, wherein the visual indicator comprises a light source, and
    the method further comprises selectively illuminating the light source to perform the step of subsequently transmitting the first configuration data signal.

6. The method according to claim 5, wherein the first configuration data signal comprises a number, and the selective illumination of the light source comprises encoding the number into an illumination sequence representing individual digits of the number.

7. The method according to claim 1, wherein the method further comprises verifying, by a human, that the configuration data encoded by the first configuration data signal matches expected configuration data, and verification by a human that the first configuration data matches expected configuration data takes place using an untrusted device.

8. The method according to claim 1, wherein the first and second tire pressure monitoring devices correspond to a wheel group of an aircraft.

9. The method according to claim 1, wherein the first and second tire pressure monitoring devices are part of a set of tire pressure monitoring devices, and the method further comprises:
    loading each of a further set of tire pressure monitoring devices with respective configuration data; and
    transmitting, from a subset of fewer than all of the further set of tire pressure monitoring devices, a configuration data signal which encodes the respective configuration data.

10. The method according to claim 9, wherein the set of tire pressure monitoring devices correspond to a first wheel group of an aircraft, and the further set of tire pressure monitoring devices correspond to a second wheel group of the aircraft different to the first wheel group.

11. The method according to claim 9, where the subset of the further set of tire pressure monitoring devices comprises a single tire pressure monitoring device of the further set of tire pressure monitoring devices.

12. The method according to claim 1, wherein loading each of the first and second tire pressure monitoring devices with respective first and second configuration data comprises utilising an untrusted device.

13. The method according to claim 1, wherein the first and second tire monitoring devices form part of a set of tire monitoring devices, and the transmitting the first configuration data signal which encodes the first configuration data takes place in a configuration data check procedure, and the method further comprises:
    transmitting, from a further subset of the set of tire pressure monitoring devices, further respective configuration data to at least one of the first and second tire pressure monitoring devices in a tire pressure check procedure different to the configuration data check procedure; and
    determining, at the at least one of the first and second tire pressure monitoring devices, whether the further configuration data matches the respective first or second configuration data.

14. The method according to claim 13, wherein the method comprises, when the further configuration data differs from the respective first or second configuration data, transmitting, from any of the set of tire pressure monitoring devices, an error signal.

15. A system comprising first and second tire pressure monitoring devices configured to operate according to the method of claim 1.

16. A tire pressure monitoring device configured to operate as part of the system according to claim 15.

17. An aircraft comprising at least one of a system according to claim 1.

* * * * *